(12) United States Patent
Denny et al.

(10) Patent No.: US 8,384,539 B2
(45) Date of Patent: *Feb. 26, 2013

(54) COLLABORATIVE INCIDENT MEDIA RECORDING SYSTEM AND RELATED METHODS

(75) Inventors: Michael S. Denny, Sharpsburg, GA (US); Edgar Shrum, Jr., Smyrna, GA (US); Steven Tischer, Atlanta, GA (US); Wade Walker, Mableton, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 900 days.

This patent is subject to a terminal disclaimer.

(21) Appl. No.: 12/498,537

(22) Filed: Jul. 7, 2009

(65) Prior Publication Data
US 2009/0267756 A1    Oct. 29, 2009

Related U.S. Application Data

(63) Continuation of application No. 11/465,154, filed on Aug. 17, 2006, now Pat. No. 7,570,158.

(51) Int. Cl.
*G08B 19/00* (2006.01)
*G08B 1/08* (2006.01)
*G08G 1/00* (2006.01)

(52) U.S. Cl. ............ 340/521; 340/539.17; 340/539.18; 340/531; 455/404.1

(58) Field of Classification Search .............. 340/521, 340/539.17, 539.18
See application file for complete search history.

(56) References Cited

U.S. PATENT DOCUMENTS

| | | | |
|---|---|---|---|
| 6,661,340 B1 | 12/2003 | Saylor et al. | |
| 6,727,811 B1 | 4/2004 | Fendis | |
| 7,019,637 B1 | 3/2006 | Johnson et al. | |
| 7,570,158 B2 * | 8/2009 | Denny et al. ................. | 340/521 |

* cited by examiner

*Primary Examiner* — Donnie Crosland
(74) *Attorney, Agent, or Firm* — Myers Bigel Sibley & Sajovec, P.A.

(57) ABSTRACT

Methods for responding to a potential incident are provided in which data about the potential incident is received from a first remote sensing unit. Additional remote sensing units are identified that may have additional data about the potential incident, and additional data about the potential incident is received from at least some of these additional remote sensing units. The totality of the received data is then analyzed, and at least one remote entity is automatically notified regarding the occurrence of the potential incident.

19 Claims, 9 Drawing Sheets

__US 8,384,539 B2__

COLLABORATIVE INCIDENT MEDIA RECORDING SYSTEM AND RELATED METHODS

CROSS REFERENCE TO RELATED APPLICATION

The present application claims priority under 35 U.S.C. §120 as a continuation of U.S. application Ser. No. 11/465,154, filed Aug. 17, 2006, now U.S. Pat. No. 7,570,158, the entire contents of which is incorporated by reference herein as if set forth in its entirety.

FIELD OF THE INVENTION

The present invention relates to information gathering and, more particularly, to systems and methods for gathering information relating to a specific incident.

BACKGROUND OF THE INVENTION

Numerous events or "incidents" occur which may require action by remote resources and/or which may be studied for some reason at a later time (e.g., as part of a later court proceeding or investigation, to determine what happened or what went wrong, etc.). Herein, the term "incident" is used to refer to a physical occurrence and/or a collection of physical occurrences for which it may be desirable to collect real-time or near real-time data and/or which may initiate the need for responsive actions. One exemplary "incident" is an automobile accident. When an automobile accident occurs, it may trigger a variety of actions and/or later proceedings. For example, in response to an automobile accident, police, fire, ambulance and/or department of transportation resources may be sent to the scene of the accident. Local hospitals may receive patients who were injured in the accident. Automobile insurance companies may receive claims relating to the accident, and may need to gather data regarding the accident in order to determine fault. Court proceedings may ultimately be initiated by individuals involved in the accident. Family members of individuals involved in the accident may need to be notified about the accident. Local television and radio stations may report the accident as part of news and/or traffic reports. Tow truck services may need to be dispatched to tow away cars damaged in the accident. These are just a few examples of the numerous actions that may be required as a result of one exemplary incident.

In response to many incidents today, little or no data relating to the incident may be collected in real time and/or in near real time. Moreover, the response to many common incidents is often formed in a piecemeal fashion and may be heavily dependent on individuals recognizing the actions that need to be taken and then initiating those actions. Improved methods and systems for responding to incidents may be desirable to enhance the collection of data regarding the incident and/or to more quickly and efficiently initiate responsive actions that may be desirable in light of the incident.

SUMMARY OF THE INVENTION

Pursuant to embodiments of the present invention, methods for identifying and responding to an incident are provided in which data relating to the incident is collected via one or more sensors of a remote sensing unit. This data is then analyzed to determine if an incident has occurred. Upon determining that an incident has in fact occurred, additional remote sensing units may be identified that may have additional data about the incident (i.e., by identifying other remote sensing units who were in the general vicinity at the time that the incident occurred). The identified remote sensing units may then be contacted in order to obtain additional sensor data collected by those remote sensing units regarding the incident.

After additional sensor data is received from the identified remote sensing units, further analysis may be performed in an effort to more specifically identify the type of incident that has occurred. In addition, each remote sensing unit may tag data collected around the time of the incident to ensure that it is not later overwritten. In some embodiments, one or more remote entities may be automatically notified regarding the occurrence of the incident.

Pursuant to further embodiments of the present invention, remote sensing units are provided which include a bank of sensors that collect sensed data. The remote sensing units also include a storage unit that stores the collected data, and a processor that may be used to analyze the collected data to determine if an incident has occurred. These units also include a communications unit which may be used to request and receive additional data about the incident from other remote sensing units upon determining that an incident has occurred.

Pursuant to yet additional embodiments of the present invention, methods for responding to an incident are provided in which information about the incident is received from a first remote sensing unit. A second remote sensing unit that may have additional information about the incident may then be identified, and information about the incident may be obtained from this second remote sensing unit. The information received from the first and second remote sensing units is then analyzed, and at least one remote entity may be automatically notified regarding the occurrence of the incident.

The analysis of the information received from the first and second remote sensing units may involve a comparison between the received data and predefined standards. The information about the incident may be received, for example, via a transmission made from a cellular device associated with the remote sensing unit that collected the information. The methods may also involve receiving information about an individual associated with the first remote sensing unit. Moreover, in some embodiments, information about the incident may be received from three or more different remote sensing units.

In certain embodiments, the second remote sensing unit that may have additional data about the incident may be identified by (1) identifying the location of the first remote sensing unit (e.g., based on the received data) and (2) determining the locations of other remote sensing units in order to identify another remote sensing unit that was in the vicinity of where the incident occurred. The current locations of these other remote sensing units may be periodically received as part of the normal operation of the system.

Prior to receiving information about the incident from the first remote sensing unit, the first remote sensing unit may (1) collect sensed data, (2) perform an initial analysis on the collected sensed data, (3) activate additional sensors based on the initial analysis, (4) collect additional sensed data, (5) analyze the totality of sensed data that is collected to determine if an incident has occurred, (6) identify a subset of the collected sensed data that should not be overwritten and/or (7) identify and then forward to a system hub a subset of the collected sensed data.

The information about the incident received from the first and/or second remote sensing units may be received directly from the remote sensing units or indirectly from, for example, a local aggregator. The local aggregator may perform the identification of a second remote sensing unit that may have additional data about the incident.

Pursuant to further embodiments of the present invention, systems for automatically responding to an incident are provided which include a main processor, a main storage unit and a communication unit. These systems may also further include other components such as, for example, an operating system, stored standards, etc. The communication unit in these systems is configured to receive data about the incident from a number of different remote sensing units. The main processor may automatically notify at least one remote entity (e.g., police, fire, etc.) via the communication unit if it is determined that an incident has occurred. This may be accomplished, for example, by referencing pre-defined instructions that specify the types of remote entities that are to be automatically notified for different types of incidents.

Other systems, methods and/or computer program products according to embodiments will be or become apparent to one with skill in the art upon review of the following drawings and detailed description. It is intended that all such additional systems, methods and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
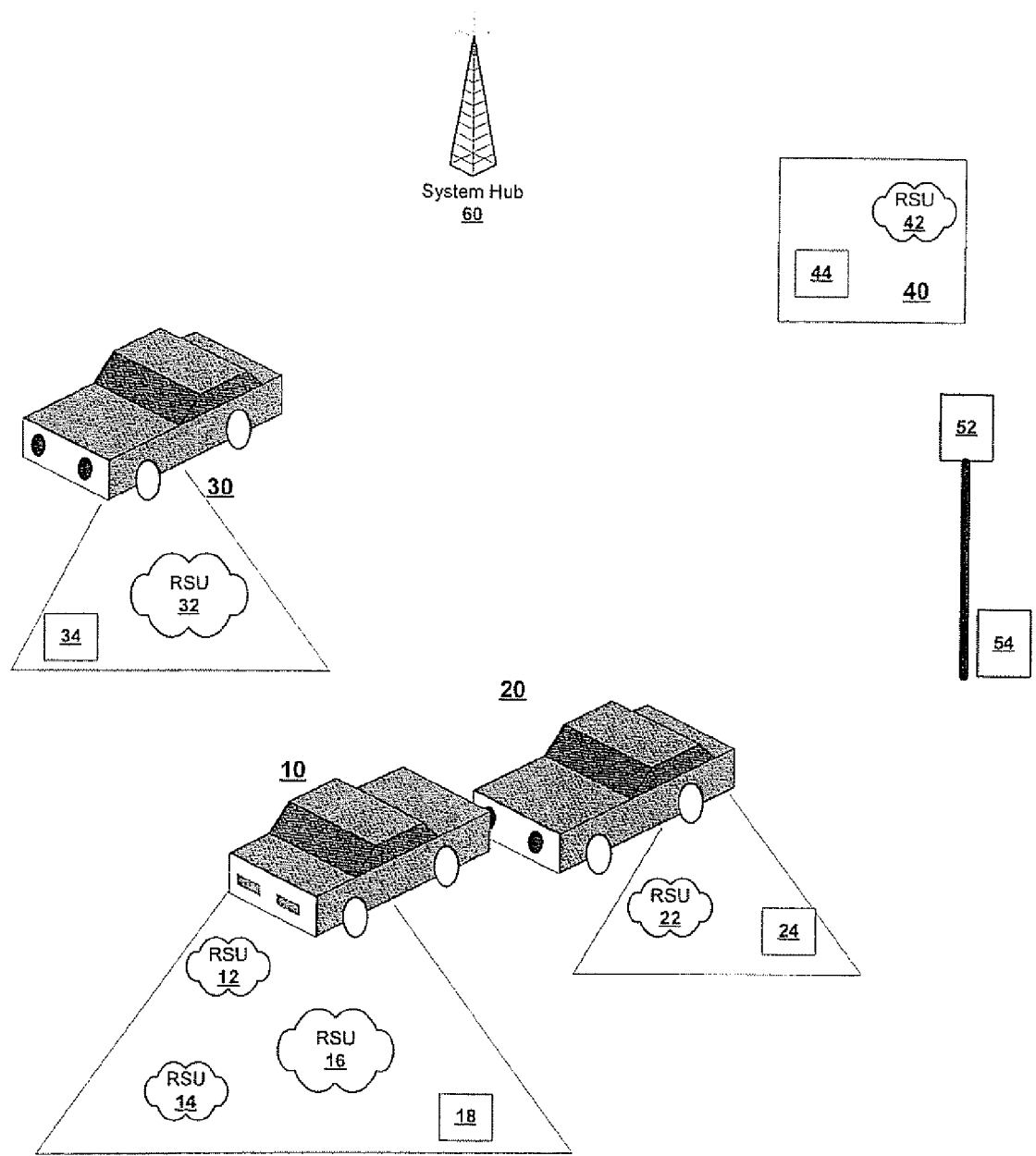
FIG. 1 is a schematic diagram illustrating an exemplary incident and elements of a system for identifying such an incident according to certain embodiments of the present invention.

Embodiments of the present invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention may be embodied as a method and/or as a system. Moreover, aspects of embodiments of the present invention may take the form of a computer program product on a computer-usable storage medium having computer-usable program code embodied in the medium. Any suitable computer readable medium may be utilized including hard disks, volatile memory, non-volatile memory, CD-ROMs, optical storage devices, a transmission media such as those supporting the Internet or an intranet, or magnetic storage devices.

Computer program code for carrying out operations of the present invention may be implemented using programmable aspects of existing application programs. Aspects of the computer program code may also be written in an object oriented programming language such as Java®, Smalltalk or C++ and/or using a conventional procedural programming languages, such as the "C" programming language. The program code may execute entirely on a single computer or on multiple computers, which may or may not be co-located.

The present invention is described below with reference to flowchart illustrations and/or block diagrams of methods and systems according to embodiments of the invention. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Pursuant to embodiments of the present invention, systems and methods are provided that may be used to identify that an incident has occurred, collect data relating to the incident, and/or coordinate responses to such incidents. As noted above, herein, the term "incident" refers to a physical occurrence and/or a collection of physical occurrences for which it may be desirable to collect real-time or near real-time data and/or which may initiate the need for responsive actions. In some situations, the methods and systems according to embodiments of the present invention may be able to accurately identify a specific type of incident that has occurred (e.g., an automobile accident, a fall, etc.) and gather data and/or initiate a response that is specifically designed for the identified type of incident. In other circumstances, the methods and systems according to embodiments of the present invention may only be capable of recognizing that something odd or unusual is occurring (e.g., a sensor has indicated a sudden increase in temperature, but insufficient data may exist to accurately deduce the underlying cause for the increase in temperature). In these situations, the systems and methods according to embodiments of the present invention may merely act to collect and/or preserve data relating to the incident, and/or to initiate a more general response to the incident.

The systems and methods according to embodiments of the present invention use a plurality of distributed sensing units, referred to herein as "remote sensing units", to collect data over a localized or wide geographic area. The remote sensing units may include both fixed and mobile sensing units. For example, in certain embodiments of the present invention, numerous individuals could carry personal remote sensing units that were, for example, built into each individual's cellular telephone. Remote sensing units could also be factory and/or after-market installed into automobiles, mounted in buildings such as homes, offices and commercial businesses, mounted on light posts and traffic lights, etc. By providing a broad network of remote sensing units, it may be possible to routinely collect data from a plurality of remote sensing units regarding any particular incident, which may increase the reliability of the system in correctly identifying when incidents have in fact occurred and/or to deduce the specific types of incidents that have occurred.

Each remote sensing unit includes one or more sensors that intermittently or continuously collect data regarding what is occurring in the vicinity of the remote sensing unit. A few examples of the types of sensors that may be included on a remote sensing unit include a noise meter, an audio recorder, an accelerometer, a speedometer, a clock, a video camera, a global positioning satellite receiver, a thermometer, a breathalyzer, a wind gauge, a seat belt sensor, etc. Typically, most or all of the sensors on each remote sensing unit will sense and record data continuously to ensure that the sensors collect data in advance of and during incidents that occur in the vicinity of the sensor. A user associated with the remote sensing unit may also be provided a capability to selectively activate and/or deactivate the sensors included in the remote sensing unit.

Some or all of the remote sensing units may include a capability for analyzing collected sensed data. When an incident occurs in the vicinity of one of the plurality of remote sensing units, the remote sensing unit may collect data relating to the incident. If analysis of this data (which may be done directly at the remote sensing unit) indicates that one or more sensors and/or combinations of sensors are "out-of-range", then realization of this fact may "trigger" the system to initiate a response to the incident. Once such a "trigger" event has occurred, the remote sensing unit will typically "tag" sensor data collected around the time of the incident for more permanent storage to ensure that it is not later overwritten with new data. The remote sensing unit will typically continue to collect and store sensor data after the system has been triggered to respond to the incident.

The remote sensing units also typically include capabilities for communicating with other remote sensing units, with a system hub, and/or with other elements of the system such as, for example, a local aggregator. Upon determining that out-of-range sensor readings indicate that an incident has occurred, a remote sensing unit (or other element of the system that makes such a determination) may identify and communicate with additional remote sensing units that are in the general vicinity of the remote sensing unit that collected the data relating to the incident. These additional remote sensing units may then be contacted (1) to ensure that they keep data that was collected around the time of the incident and/or (2) to request that they transmit the relevant data to a system element that will perform further analysis of the incident based on an aggregation of sensed data collected by a plurality of remote sensing units. An element of the system may also initiate a response to the incident such as dispatching police, fire and/or ambulance units to the location of the incident.

FIG. 1 is a high level schematic diagram that illustrates elements of a system according to embodiments of the present invention that may be used to identify and respond to an exemplary incident. In the particular example of FIG. 1, the incident at issue is an automobile accident that occurs between a first vehicle 10 and a second vehicle 20. In the example of FIG. 1, the first vehicle 10 that is involved in the automobile accident has two passengers (not shown). Each of these passengers may be carrying a personal remote sensing unit 12, 14. The first vehicle 10 may also have a remote sensing unit 16 built into the vehicle. The second vehicle 20 has a single passenger (not shown) who is carrying a remote sensing unit 22. In this example, the second vehicle 20 does not include a built in remote sensing unit. When the first and second vehicles 10, 20 collide, each of the remote sensing units 12, 14, 16 and 22 collect sensor data that may provide information about the crash. This sensor data is depicted in FIG. 1 as a first data set 18 that reflects the combined data collected by remote sensing units 12, 14, 16 that are contained within the first vehicle 10, and a second data set 24 that contains the data collected by remote sensing unit 22.

As is also shown in FIG. 1, additional remote sensing units may be in the general vicinity when the automobile accident involving the first vehicle 10 and the second vehicle 20 occurs. For example, another vehicle 30 that contains an embedded remote sensing unit 32 may be traveling the same stretch of road at the time of the accident, and the remote sensing unit 32 may be in a position to collect data relating to the accident. In many situations, a vehicle such as the third vehicle 30 will not stop in response to the accident, because, for example, the passengers in the vehicle do not realize that an accident has occurred, do not want to get involved, are not particularly close to the accident, have other pressing commitments or are traveling away from the accident at the time that the accident occurs. However, the third vehicle 30 may have collected data about the accident (third data set 34) which may be useful in determining if an incident has occurred and, if so, the type of incident, and/or which may be useful in later analyzing or investigating the incident. As is also shown in FIG. 1, in addition to other vehicles, there may be pedestrians such as pedestrian 40 that are in the vicinity at the time the automobile accident occurs. Pedestrian 40 may also be carrying a remote sensing unit 42 that may have collected additional data (fourth data set 44) about the accident. Other fixed or mobile remote sensing units, such as remote sensing unit 52 which is mounted on a highway light pole, may also be in the general vicinity of the accident and may collect data that relates to the accident such as fifth data set 54.

It will be appreciated that the types of sensors carried by each remote sensing unit 12, 14, 16, 22, 32, 42, 52, and hence the collected sensor data contained in the data sets 18, 24, 34, 44, 54, may be quite varied. For example, the first data set 18 and/or the second data set 24 may include accelerometer data, speedometer data, audio data, braking data, global positioning satellite location data, temperature data, rain detector information, information regarding the number of passengers, seat belt status information, breathalyzer information, trajectory information, etc. Some of this collected data may be indicative of an automobile accident (i.e., a sudden deceleration, the stopping of the vehicle, the vehicle decelerating more quickly than anticipated based on the braking data, audio recordings of the sound of the vehicles colliding, etc.). The data collected by the "bystander" remote sensing units 32, 42, 52 on the other hand, will likely not include accelerometer or speedometer data that is indicative of an automobile accident (as remote sensing units 32, 42, 52 were not directly involved in the accident), but may contain similar data (e.g., audio recordings) and/or additional data (e.g., video recordings of the accident, smoke detector readings, glass break sensor readings, etc.) that may suggest that an incident has occurred and/or may help to identify the type of incident that has occurred. It will also be appreciated that the remote sensing units 32, 42, 52 may collect such data regarding the incident from different positions and/or perspectives. For example, the bystander 40 may be located several stories up in a building overlooking the intersection where the automobile accident occurred. Such a perspective may provide additional data about the incident (e.g., a video recording from a better camera angle for determining who was at fault in the accident) that might not be available without the collaborative data collection and analyses capabilities according to embodiments of the present invention.

The systems and methods according to embodiments of the present invention may allow for collaboration between some or all of the remote sensing units 12, 14, 16, 22, 32, 42, 52 in order to collect and save data relating to the incident (here an automobile accident) and/or to coordinate a response to the incident. In particular, as shown in FIG. 1, a remote sensing unit such as remote sensing unit 16 may initiate communication with some or all of the other remote sensing units in the general vicinity (e.g., remote sensing units 12, 14, 22, 32, 42) using, for example, a direct communication link, a paging channel, etc. As part of these communications, remote sensing unit 16 may, for example, direct each of the other remote sensing units 12, 14, 22, 32, 42 to (1) provide identification information, (2) more permanently store any sensed data that each of these remote sensing units may have collected about the accident and/or (3) to forward sensed data collected about the incident to remote sensing unit 16 and/or to some other element in the system (such as system hub 60).

In the above manner, the collaborative systems and methods according to embodiments of the present invention may be able to significantly increase the amount of data that is collected regarding a wide variety of incidents by widely deploying a large number of remote sensing units and then providing mechanisms for these remote sensing units to save and/or share data. Moreover, as the amount of data regarding an incident that is collected increases, the system may gain the ability to more specifically identify the type of incident that occurred, and coordinate appropriate responses to the incident in light of this determination.

Figure 2:
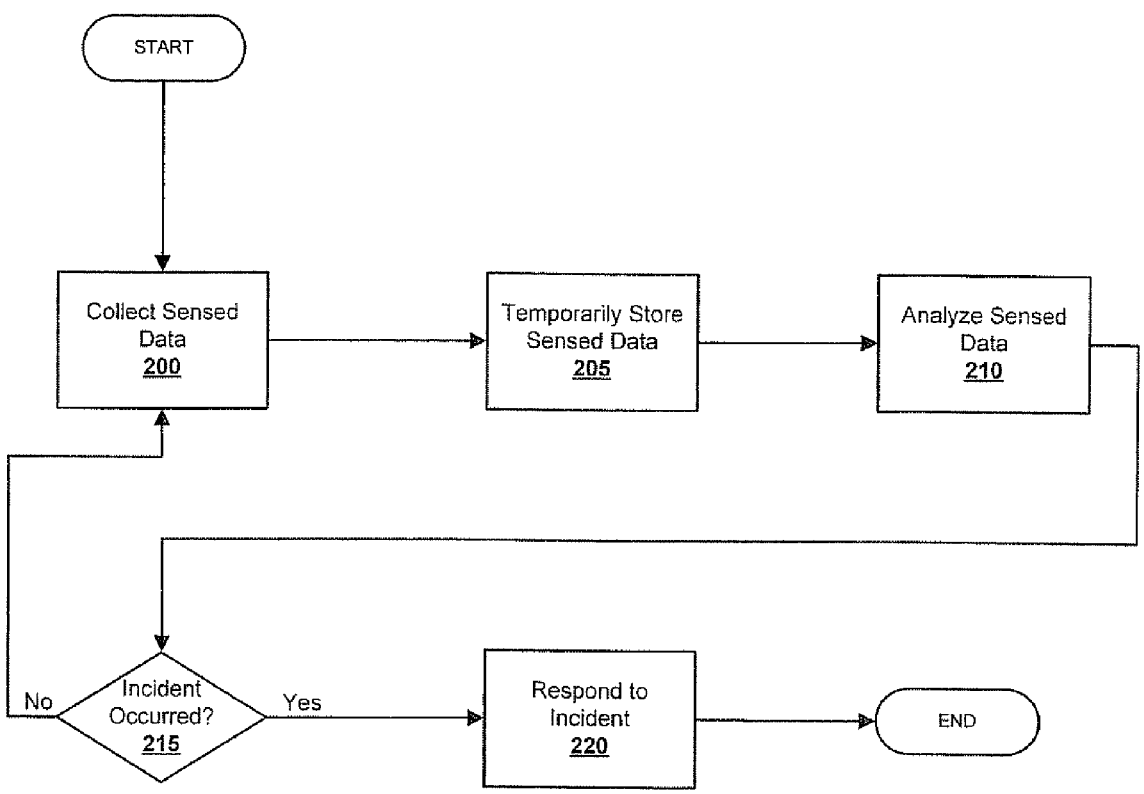
FIG. 2 is a flowchart illustrating operations for collecting and analyzing data at a remote sensing unit according to certain embodiments of the present invention.

FIG. 2 is a flow chart that illustrates methods according to certain embodiments of the present invention for detecting that an incident has occurred and for then responding to the incident. The method of FIG. 2 may be carried out at one or more remote sensing units, at a system hub, at a local aggregator, at other elements of the system, or at a combination thereof. As shown in FIG. 2, operations may begin at block 200 with the collection of sensed data by one or more sensors of at least one remote sensing unit such as, for example, remote sensing unit 16 in FIG. 1. The collected sensed data is then temporarily stored in memory or another storage media (block 205). The storage media may or may not be located in the same physical location as the remote sensing unit. Block 205 indicates that the storage is "temporary" because, in many cases, memory constraints or other limitations in available storage may exist such that a remote sensing unit may not permanently store all of the data it collects. As such, data collected by the remote sensing unit may only be stored for a relatively short period of time, and will thereafter be overwritten with new sensed data. The collected sensor data may, in embodiments of the present invention, be stored in a standard data language such as XML.

As also shown in FIG. 2, the collected sensed data is analyzed at block 210. As discussed in more detail herein, the operation of block 210 may involve the analysis of data collected by a single remote sensing unit, or data collected by a plurality of remote sensing units. Based on the analysis of block 210, a determination is made at block 215 as to whether or not an incident has occurred. As discussed in more detail herein, this determination may involve, for example, comparing the collected data to pre-defined standards to determine whether any of the collected data, or combinations of collected data, fall outside expected ranges or values. If the collected data falls within the expected ranges, then the system simply continues to collect, temporarily store and analyze data as shown in blocks 200, 205, 210 of FIG. 2. If, on the other hand, at block 215 the collected data falls outside the expected ranges, it is assumed that an incident has occurred, which triggers the system to respond to the incident in one or more ways as indicated at block 220 of FIG. 2.

It will be appreciated that the "response" to the incident depicted at block 220 of FIG. 2 may involve a variety of different actions. For example, one response that may be initiated at block 220 is for one or more elements of the system (e.g., a remote sensing unit or a system hub, if provided) to identify other remote sensing units that may have collected data regarding the incident. As will be discussed in more detail herein, this may be accomplished in a variety of different ways, and can even effectively be accomplished prior to occurrence of an incident by having the remote sensing units periodically or continuously identify nearby remote sensing units. Once such remote sensing units have been identified, the system (e.g., a remote sensing unit or a system hub) may request, for example, that the identified remote sensing units more permanently store the sensed data that was collected during the time period when the incident occurred, and perhaps the time periods immediately prior and/or subsequent to the incident. The remote sensing units may accomplish this, for example, by storing the relevant data to a separate storage media and/or by otherwise designating the segments of the storage media that contain the relevant data so that the data is not overwritten, or so as not to be overwritten prior to the time at which a copy or the sensed data is forwarded elsewhere. Such a step may help ensure that the data is available at a later date so that it may be considered in any later investigation or analysis of the incident In some embodiments of the present invention, the response at block 220 of FIG. 2 may further include requesting that the remote sensing units that are identified as potentially having data regarding the incident transmit this data to another remote sensing unit, to a system hub, and/or to some other element of the system. This data may then be used, for example, in part of a second analysis similar to the analysis of block 210 that is used to make a final determination as to whether an incident has occurred and/or as a means of attempting to more specifically identify the type of incident that has occurred. In some situations, the response may further include activating additional sensors on one or more remote sensing units, and/or modifying the current settings on various sensors (e.g., redirecting a video camera to point in the direction where an incident is believed to have happened).

Finally, as discussed in further detail herein, the response to the incident at block 220 may also involve contacting an individual associated with one of the remote sensing units that collected data regarding the incident and/or notifying one or more remote entities or resources regarding the incident.

Figure 3:
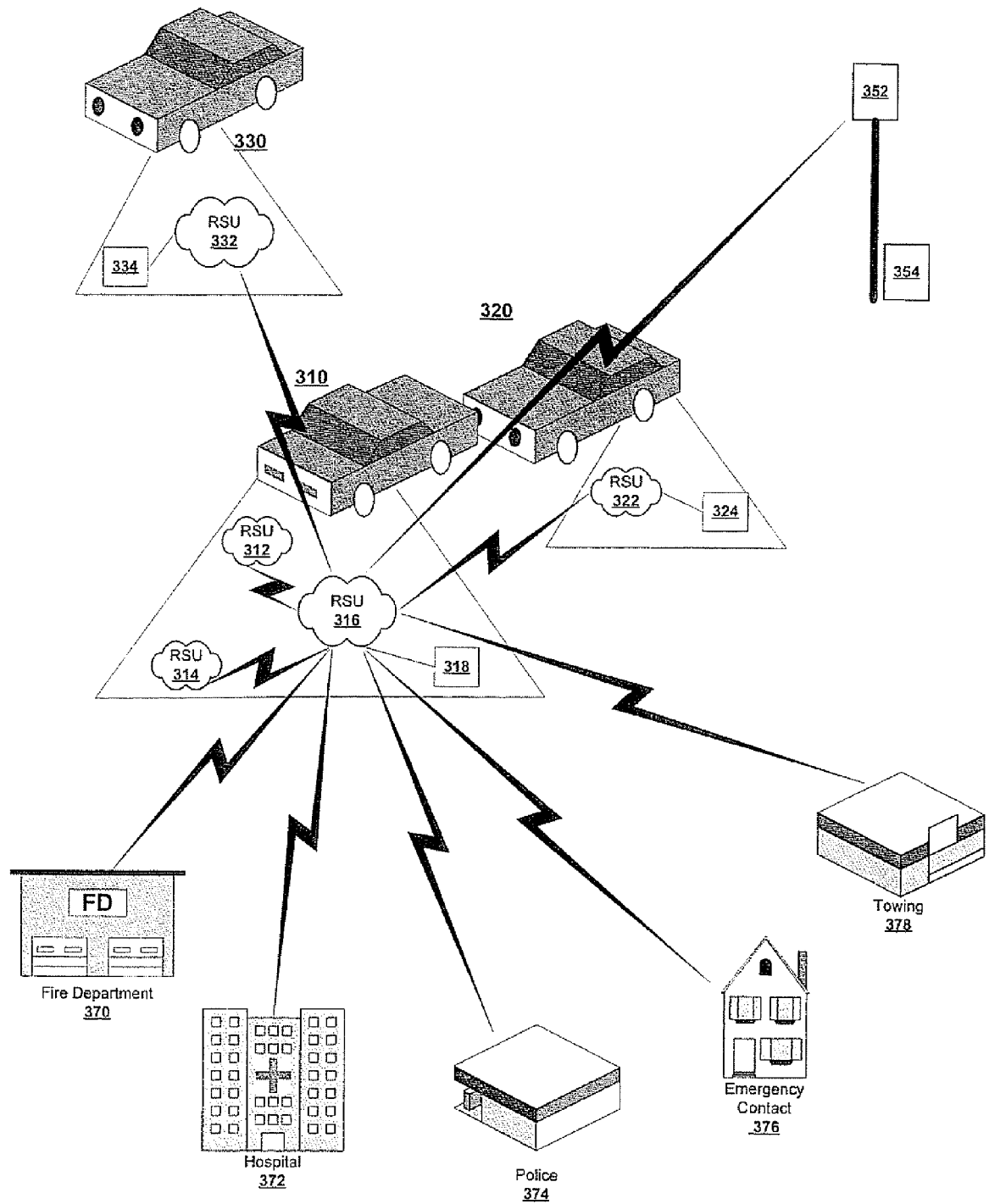
FIG. 3 is a schematic diagram illustrating an exemplary incident and elements of a system for identifying and responding to such an incident according to further embodiments of the present invention.
Figure 4:
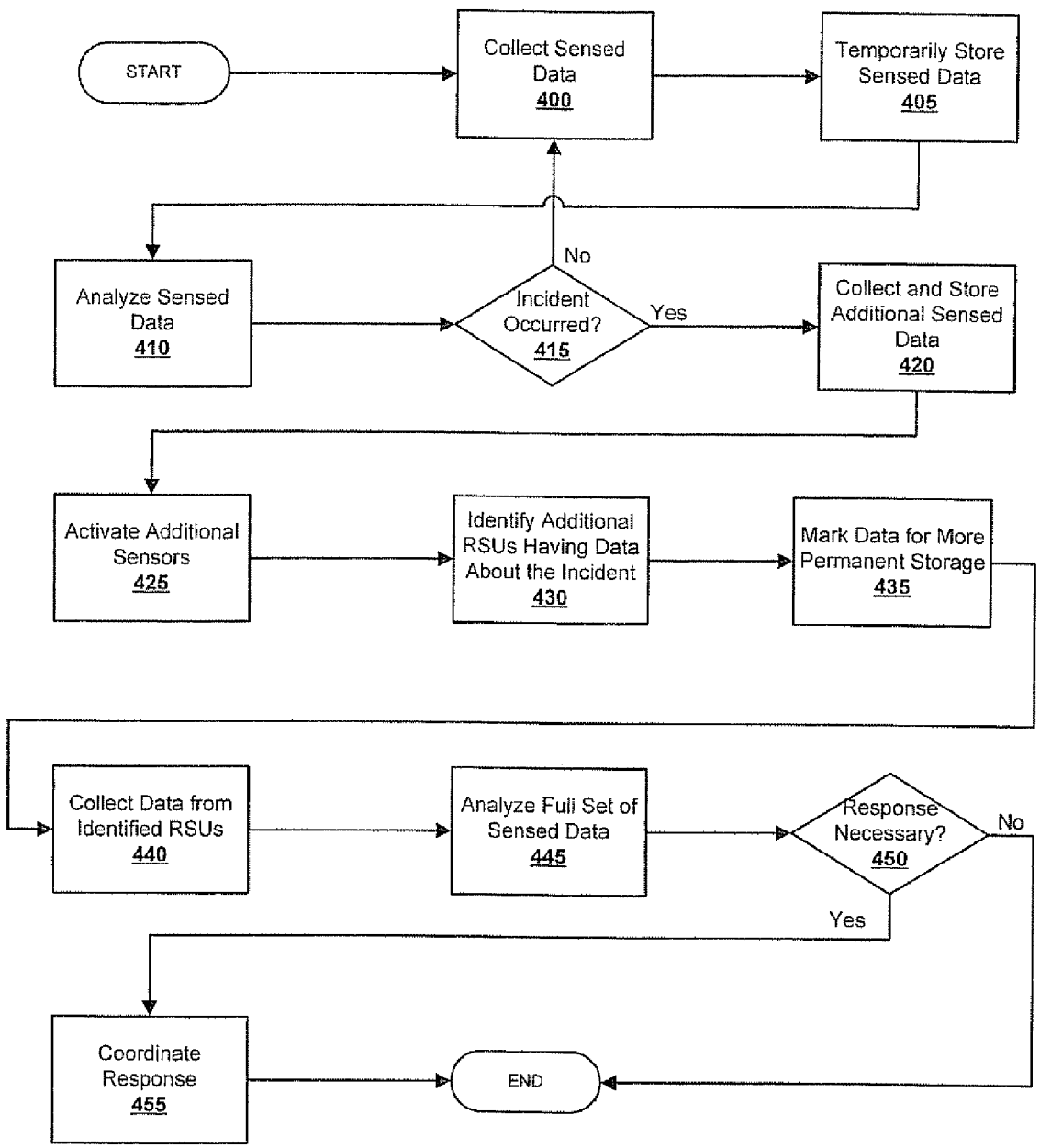
FIG. 4 is a flowchart illustrating operations for identifying and responding to an incident according to further embodiments of the present invention.

FIGS. 3 and 4 illustrate an embodiment of the present invention in which the analysis of the collected sensed data and the response to the identification of an incident is carried out at a remote sensing unit. FIG. 3 is a schematic diagram illustrating several remote sensing units that are in the vicinity of an automobile accident (i.e., an exemplary incident). FIG. 4 is a flow chart illustrating operations that may be performed at, for example, the remote sensing unit 316 of FIG. 3 to identify that the automobile accident has occurred and to coordinate an appropriate response thereto.

As shown in FIG. 3, an automobile accident occurs between a first vehicle 310 and a second vehicle 320. The first vehicle 310 involved in the automobile accident has two passengers (not shown), each of whom is carrying a personal remote sensing unit 312, 314, and the first vehicle 310 also has a built-in remote sensing unit 316. The second vehicle 320 has a single passenger (not shown) who is carrying a remote sensing unit 322. A third vehicle 330 that contains an embedded remote sensing unit 332 is also in the vicinity at the time of the accident, and a fixed remote sensing unit 352 is also located nearby. When the first vehicle 310 collides with the second vehicle 320, each of the remote sensing units 312, 314, 316, 322, 332, 352 may collect sensor data that provides information about the collision. This collected sensor data is depicted in FIG. 3 as data sets 318, 324, 334, 354. The flow chart of FIG. 4 depicts an exemplary set of operations that show how the remote sensing unit 316 may identify that the automobile accident occurred in one specific embodiment of the present invention, and respond to the accident by contacting for example, a fire department 370, a hospital 372, a police department 374, an emergency contact 376 and/or a towing service 378.

As shown in FIG. 4, operations begin at block 400 with the remote sensing unit 316 collecting sensed data using its sensors. The data collected from the sensors is stored in some fashion at block 405. As noted above, due to memory constraints, the collected sensed data may be periodically overwritten to reduce the memory or other storage requirements of the remote sensing unit. As shown at blocks 410 and 415, the remote sensing unit may also either periodically or continuously analyze the collected sensed data to determine if an incident has occurred. Exemplary ways of making such a determination are discussed in more detail herein. If no incident is deemed to have occurred, operations return from block 415 to block 400. If an incident is deemed to have occurred, then the remote sensing unit continues to collect and store additional sensed data (block 420). In addition, the remote sensing unit may optionally activate additional sensors, such as sensors that are normally in standby mode due to power consumption constraints, cost concerns, memory storage limitations, wear concerns, etc. (block 425).

As shown at block 430 of FIG. 4, the remote sensing unit may also proceed to identify additional remote sensing units (RSUs) that may have collected data about the incident (and/or which could be activated to start collecting data about the incident). This may be accomplished in a variety of ways. For example, in some embodiments of the present invention, the remote sensing units may have a low power communication system which they can use to communicate via, for example, a paging channel, with other remote sensing units in the general vicinity (e.g., within a mile). A remote sensing unit that determines that an incident has occurred may use such a paging channel to page all other remote sensing units in the general vicinity. The remote sensing unit may then assume that any remote sensing units that respond to the page may have data regarding the incident, or may collect data (e.g., global positioning satellite data) from the responding remote sensing units to make a determination as to whether the responding remote sensing units have data regarding the incident.

In other embodiments, a remote sensing unit may use mesh networking techniques at block 430 of FIG. 4 to identify additional remote sensing units (RSUs) that may have collected data about the incident. Pursuant to these mesh networking techniques, the remote sensing unit might, for example, contact other nearby remote sensing units who, in turn, would contact other nearby remote sensing units on an ad hoc basis in order to identify all of the remote sensing units that were in the general vicinity of the incident. GPS data could be included in the messages forwarded between remote sensing units to ensure that only remote sensing units in the general vicinity of the incident are contacted. In still other embodiments, a page could be sent to every remote sensing unit and responsive information provided by the remote sensing units (e.g., location data) could be used to identify which other remote sensing units are likely to have collected data regarding the incident. In still other embodiments, every remote sensing unit could continuously or periodically broadcast its identification (e.g., via an ultrawideband system) and perhaps other information, such as its location, which could then be used by a remote sensing unit to identify the other remote sensing units in the vicinity of the incident. In still further embodiments, at block 430 of FIG. 4 the remote sensing unit might sense communications networks that are operating in the area and send out a page or messages on each different type of network as means of contacting and identifying other remote sensing units in the general vicinity. In other embodiments, a system hub (or other system element) could track the location of some or all of the remote sensing units, and the identification step at block 430 could simply comprise requesting the identification from such a system hub. Various other methods of identifying remote sensing units having data regarding the incident may be implemented.

Once the additional remote sensing units that may have such data are identified, the identified remote sensing units may be asked to "tag" the data for more permanent storage (block 435). In this way, the system can ensure that relevant sensed data is not overwritten so that it is available for use in later investigations and/or analyses of the incident.

One of the remote sensing units (e.g., the remote sensing unit that identified that an incident occurred) may then proceed to collect data from each of the other identified remote sensing units. Once this additional data is collected, as shown at block 440 of FIG. 4, the remote sensing unit may perform a second analysis (block 445), this time on the more complete data set that includes data from additional remote sensing units and perhaps additional data collected subsequent to the identification of the incident at block 415. Based on this analysis, the remote sensing unit may determine whether a response is necessary to the identified incident (block 450). While this determination may be made earlier in other embodiments of the present invention, by waiting until a more complete data set has been collected and analyzed, it may be possible to more accurately identify the type of incident that has occurred and therefore enact a response that is appropriate for the specifically identified incident. At block 455, the remote sensing unit coordinates such a response, if necessary.

The responsive measures that are enacted at block 455 in response to determining that an incident has occurred may be preprogrammed responses. The particular response selected may be based on, for example, the analysis of the sensed data performed at block 445 (or alternatively based on the analysis performed at block 410) of FIG. 4. Referring again to our automobile accident example of FIG. 3, the analysis of the sensed data by remote sensing unit 316 may indicate with a high degree of probability that the first vehicle 310 was involved in some sort of collision. Upon making this determination, the remote sensing unit 310 could be programmed to automatically notify the local fire department 370, the nearest hospital 372 (or emergency response unit) to the site of the collision, and/or the closest police substation 374. The remote sensing unit could also provide these public authorities with information such as the time and location of the accident, video clips (if any) of the accident, etc. In other embodiments, the remote sensing unit 310 could alternatively be programmed to send the incident data to an individual who would then analyze the data and make a decision as to whether or not to notify various third parties such as a fire department 370, a hospital 372 and/or the police 374. In some embodiments of the present invention, the response can be much broader, and include, for example, notifying media outlets of the accident (for purposes of traffic reporting), notification of insurance companies of individuals that appear to have been involved in the accident, contacting emergency contacts of individuals involved in the accident, contacting towing services such as towing service 378 in FIG. 3, etc.

In still further embodiments of the present invention, the remote sensing unit may initiate a series of "internal" responses based on the determination that a certain type of incident has occurred. For example, the remote sensing unit 316 installed in automobile 310 could, for example, automatically unlock doors, open windows or even stop the engine on automobile 310 upon determining based on the sensed data that an automobile accident has occurred.

While the above example discussed with respect to FIGS. 3 and 4 focuses on an incident which is identified by a remote sensing unit that is involved in the incident (i.e., the remote sensing unit 316 that is in one of the cars involved in the accident), it will be appreciated that the remote sensing unit that identifies the incident may also be an "observer" remote sensing unit that is not involved in the incident (e.g., remote sensing unit 332). An "observer" remote sensing unit may end up being the remote sensing unit that identifies an incident for a variety of reasons. For example, in some cases, no remote sensing units may be involved in the incident (i.e., two cars may collide that do not include remote sensing units). In other cases, the incident may impair or destroy the ability of any remote sensing units involved in the incident to determine that an incident has occurred or to send out the necessary communications. In still other cases, the "observer" remote sensing unit may collect better data than a remote sensing unit involved in the incident. In other cases, both a remote sensing unit involved in an incident and an "observer" remote sensing unit may correctly identify that an incident has occurred, but the "observer" remote sensing unit may do so first. In any event, the point is that embodiments of the present invention may allow any remote sensing unit to identify that an incident has occurred and therefore coordinate a response thereto (whether that response is done by the remote sensing unit, a system hub, or some other system element), regardless of whether or not the remote sensing unit was actually involved in the incident.

According to further embodiments of the present invention, a system hub such as system hub 60 illustrated in FIG. 1 may be provided that may facilitate coordinating operations between a plurality of remote sensing units and/or in coordinating an appropriate response to an identified incident. In such embodiments, one or more remote sensing units may make an initial determination that an incident has occurred. Upon making this determination, the system hub is alerted and/or data regarding the incident ("incident data") is forwarded to the system hub. This incident data may comprise, for example, collected sensor data, data based on an analysis of collected sensor data or a combination thereof. Upon receipt of an incident alert and/or incident data, the system hub may collect additional data from other remote sensing units that may have collected sensed data relating to the incident. This may be accomplished, for example, by the system hub identifying additional remote sensing units that are in the immediate vicinity of the remote sensing unit that provided the incident alert, and then requesting that each such remote sensing unit forward incident data to the system hub. The system hub may then aggregate all of the collected incident data and analyze this aggregated data to determine an appropriate response to the incident.

Figure 5:
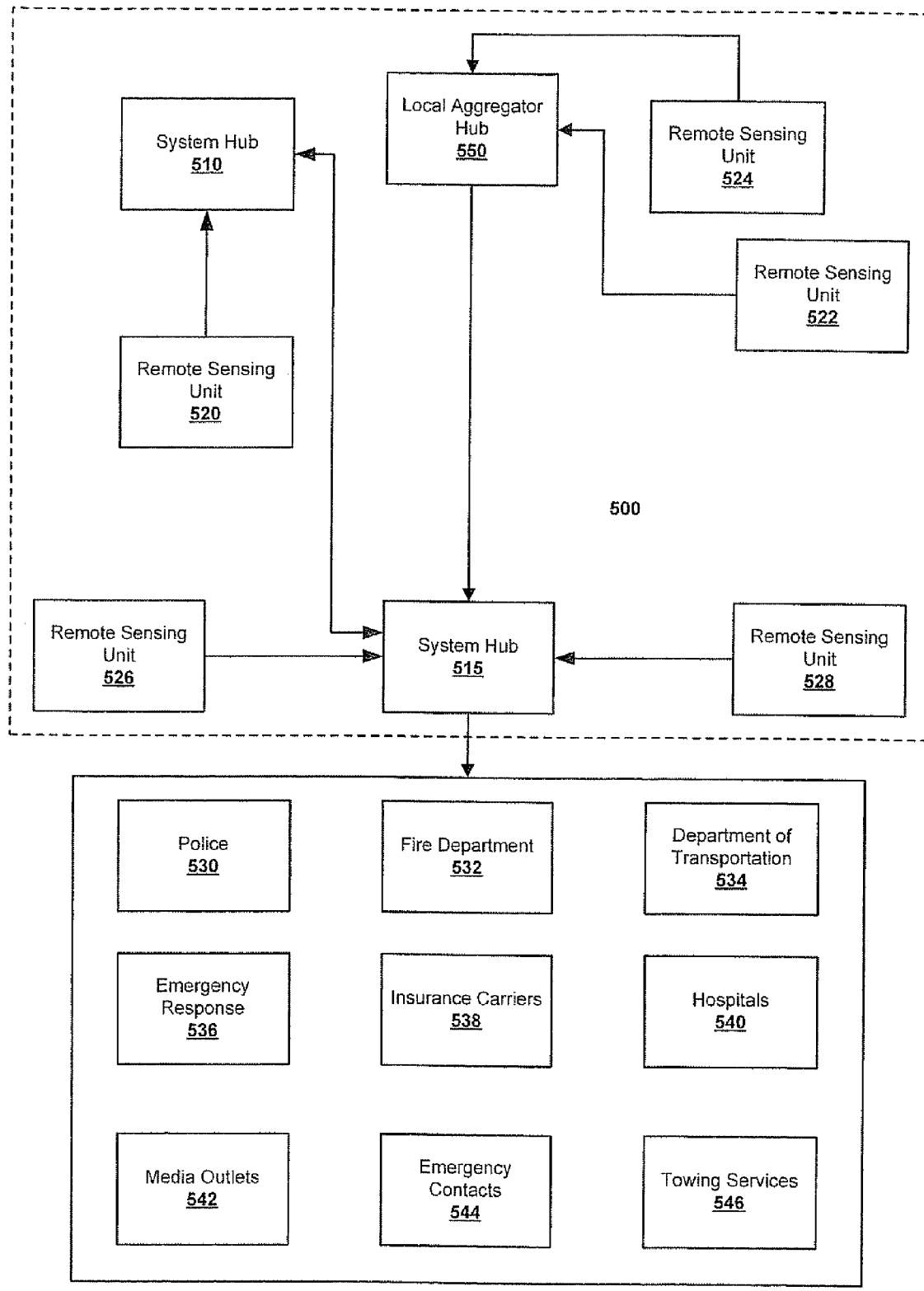
FIG. 5 is a block diagram illustrating a system for identifying and responding to an incident according to still further embodiments of the present invention.

FIG. 5 is a block diagram illustrating an exemplary system 500 according to embodiments of the present invention that includes a plurality of system hubs 510, 515. It will be appreciated that, in other embodiments, a single system hub or a larger number of system hubs may be provided. As shown in FIG. 5, the system 500 also includes a plurality of remote sensing units 520, 522, 524, 526, 528 and a local aggregator 550. The system 500 may interface with a plurality of remote entities or resources such as, for example, police departments 530, fire departments 532, state or local departments of transportation 534, emergency response or other medical services 536, insurance carriers 538, hospitals 540, media outlets (e.g., television and radio stations) 542, emergency contacts 544 and/or towing services 546. The remote entities illustrated in FIG. 5 are exemplary in nature, and it will be appreciated that additional and/or different remote entities/resources may interface with the system 500.

Each of the remote sensing units 520, 522, 524, 526, 528 may be in at least intermittent communication with at least one of the system hubs 510, 515. Each of the remote sensing units 520, 522, 524, 526, 528 collects data via a plurality of sensors. At least some of this collected data is then transmitted to one or more of the system hubs 510, 515.

As shown in FIG. 5, in certain embodiments, one or more local aggregators 550 may be provided. In some embodiments, the local aggregator 550 may be a remote sensing unit that aggregates sensed data collected from additional remote sensing units. By way of example, several individuals may be riding in an automobile, and each of these individual may carry a remote sensing unit. The automobile may also have a remote sensing unit. In many cases, the remote sensing unit carried by the automobile may be a more sophisticated device that includes more and/or better sensors than the mobile remote sensing units that are carried by individuals. In this situation, the remote sensing unit in the car may act as a local aggregator 550 that takes data collected by its own sensors and also communicates with nearby remote sensing units to collect additional data. The local aggregator may then make a determination as to whether an incident has occurred based on the aggregated incident data collected by multiple remote sensing units. The remote sensing unit in the automobile may automatically communicate with pre-identified remote sensing units (i.e., the remote sensing units owned by members of the family who own the automobile) or, alternatively, the remote sensing unit in the automobile may identify and communicate with any remote sensing units that happen to be in the area at the time that the incident occurs. An example of such a local aggregator is remote sensing unit 316 in FIG. 3, which collects and aggregate into a single data set 318 the sensed data from remote sensing units 312, 314 and 316 (remote sensing unit 16 of FIG. 1 may also act as a local aggregator in a similar fashion).

In other embodiments, the local aggregator 550 may comprise a stand alone unit that does not have sensing capabilities that collects and aggregates sensed data from a plurality of remote sensing units (in which case the local aggregator may appear to simply be a remote extension of the system hub 515). In any event, as shown in FIG. 5, the local aggregator 550 communicates directly with a plurality of remote sensing units 522, 524 that are, for example, in the general geographic area of the local aggregator 550. In the embodiment of FIG. 5, the local aggregator 550 communicates with the system hub 515, and may either simply forward the information communicated from the remote sensing units 522, 524, or may analyze the information communicated from the remote sensing units 522, 524 and then forward conclusions, summary data or other information to the system hub 515.

Figure 6:
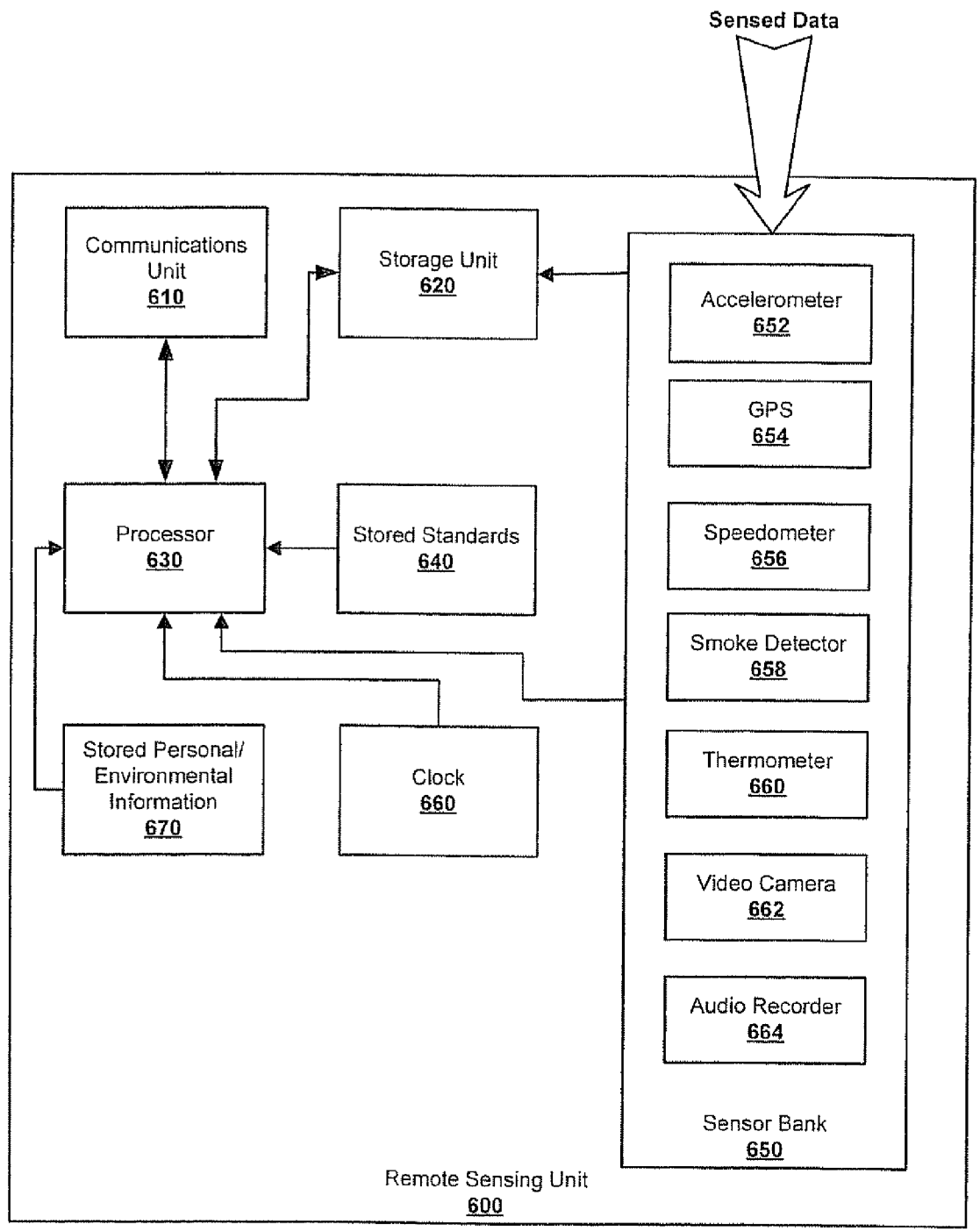
FIG. 6 is a block diagram of an exemplary remote sensing unit according to certain embodiments of the present invention.

FIG. 6 is a block diagram that illustrates an exemplary embodiment of a remote sensing unit 600 according to certain embodiments of the present invention. Any one of, or all of, the remote sensing units illustrated in FIGS. 1, 3 and/or 5 could be implemented using the remote sensing unit 600 of FIG. 6. As shown in FIG. 6, the remote sensing unit 600 may include a communications unit 610, a storage unit 620, a processor 630, stored standards 640, a sensor bank 650, a clock 660 and stored personal and/or environmental information 670.

The communications unit 610 may be used to transmit and receive information between the remote sensing unit 600 and other remote sensing units as in the embodiments of FIGS. 1 and 3, and/or to transmit and receive information between the remote sensing unit 600 and a local aggregator and/or one or more system hubs (such as the local aggregator 550 or system hub 515 in FIG. 5). The communications unit 610 may comprise, for example, a cellular telephone, an internet protocol or other packet switched wireless communications device, a Bluetooth or WiMax connection, a landline telephone, a wired internet connection, a combination thereof, or any of a wide variety of other communications systems. In some embodiments, each remote sensing unit can directly communicate with all of the other elements of the system (e.g., other remote sensing units, local aggregators and system hubs). In other embodiments, some remote sensing units may only have indirect communications ability. By way of example, a remote sensing unit mounted in an automobile might include a communication unit 610 that is implemented as a Bluetooth transceiver. This Bluetooth transceiver could then interface with other remote sensing units and/or a system hub via a Bluetooth connection to a cellular telephone of one of the occupants of the automobile, and a cellular connection from that cellular telephone to the system hub.

It will also be appreciated that the communications unit 610 may encrypt data prior to transmission in order to protect the integrity of the system. Likewise, communications units provided with other system elements such as system hubs and/or local aggregators may likewise encrypt data prior to transmission. Each device may also have authentication functionality so that other elements of the system can confirm that they are receiving communications from valid users of the system As is also shown in FIG. 6, the remote sensing unit also includes a storage unit 620. Storage unit 620 will typically be implemented as some form of computer storage medium such as, for example, volatile or non-volatile memory, hard disks, CD-ROMs, optical storage devices or magnetic storage devices. The storage unit 620 may be used to, among other things, store data collected by the sensors included in the sensor bank 650, which data is referred to herein as "sensed", "sensor" and/or "collected" data.

The remote sensing unit 600 may further include "stored standards" 640. Herein, the term "stored standards" is used to refer to benchmarks which may be compared to sensed data collected by the sensors in sensor bank 650 to make determinations such as, for example, a determination as to whether or not an incident has occurred. The stored standards may, for example, be expressed as values or ranges of values for the data collected by one or more sensors that are considered to indicate that an incident has occurred. The standards may include certain values or ranges of values when all the sensors are from a single remote sensing unit, and different values or ranges of values when sensors from two or more remote sensing units are considered. The stored standards may also take into account other information, such as the locations of the remote sensing units from which sensed data has been collected, or other stored information such as maps. The stored standards 640 may be maintained, for example, in a portion of the storage unit 620. Alternatively, the stored standards 640 may be maintained in a separate storage unit such as, for example, a read only memory or random access memory. The stored standards 640 might also be implemented as firmware.

The clock 660 that is provided in the remote sensing unit 600 may be used to "time-stamp" an incident (i.e., to identify a specific time or period of time when sensed data was collected that indicates that an incident has occurred). Such time-stamping of an incident may facilitate collecting sensed data from additional remote sensing units regarding the incident. The clocks on all the remote sensing units may be synchronized via the network to ensure accurate time-stamping of an incident and to ensure that the data collected by various remote sensing units about an incident can be combined using a common temporal reference.

The remote sensing unit may also include stored personal and/or environmental data 670. This information may be stored, for example, in a portion of the storage unit 620 or in a separate storage (i.e., in a SIM card on a cellular telephone). Storage of personal information will typically be done when a remote sensing unit is associated with a single individual or with a small croup of individuals (e.g., a family), which will often be the case when the remote sensing unit 600 is carried by an individual or installed in an automobile or personal residence. The personal information may include a wide variety of information that may be required by the system for various responses to certain types of incidents. Such information could includes for example, names, addresses, social security numbers, medical records, known allergies, health and auto insurance policy and carrier information, emergency contact information and the like. When the remote sensing unit 600 determines that an incident has occurred, it may forward selected of the personal information to another remote sensing unit, a local aggregator and/or a system hub for use in the response to the incident.

The remote sensing unit 600 also includes a sensor bank 650. The sensor bank 650 includes one or more sensors that collect data regarding the surrounding environment. The block diagram of FIG. 6 illustrates exemplary sensors that may be included in the sensor bank 650 such as an accelerometer 652, a global positioning satellite receiver 654, a speedometer 656, a smoke detector 658, a thermometer 660, a video camera 662, and an audio recorder 664. It will be appreciated, however, that selected ones of a wide variety of known or later developed sensors could be included in the sensor bank 650 (e.g., a heart rate monitor, an internal thermometer, a motion detector, a glass break sensor, etc.). It will also be appreciated that the sensor bank 650 in different remote sensing units may include any number and/or any combination of sensors. For example, sensor banks included in automobiles may use sensors that are already standard equipment in the automobile such as, for example, a speedometer, seat belt sensors, rain sensors (i.e., whether or not the windshield wipers are operating), a pulse and/or internal temperature monitor (e.g., on the steering wheel of a car), etc. The number and types of sensors included within a particular sensor bank 650 may be selected, for example, based on cost considerations, weight and size constraints, the location where the remote sensing unit 600 will be deployed, whether or not the remote sensing unit 600 is a fixed or mobile unit, etc.

As shown in FIG. 6, the sensors in the sensor bank 650 collect data regarding the surrounding environment. The sensor unit feeds this sensed data to the storage unit 620 by, for example, a direct connection or via the processor 630. The storage unit 620 stores the sensed data at least temporarily. A user may also be provided with a capability to manually activate and/or deactivate some or all of the sensors in the sensor bank.

The remote sensing unit 600 further includes a processor 630. The processor 630 may be any type of computational or comparative device that may be used to periodically compare sensed data stored in the storage unit 620 to the stored standards 640 to determine if it is likely that an incident has occurred. As noted above, the stored standards 640 may comprise elaborate formulas or algorithms that may be compared to the sensed data collected by various sensors to make a determination as to whether or not an incident has occurred. By way of example, stored standards may be provided that are designed to identify when an automobile accident occurs. The sensor bank 650 in a particular remote sensing unit 600 may include, among other things, an accelerometer 652, a GPS positioning receiver 654, an audio recorder 664 and a glass break sensor. If this remote sensing unit 600 is carried by an individual that is involved in an automobile accident, it is likely that in a very short period of time (i.e., a matter of a few seconds), the accelerometer 652 will record a rapid deceleration, the audio recorder 664 will record a short, sudden crunching noise and the glass break sensor may record high frequency sounds associated with breaking automobile safety glass. In addition, the GPS receiver 654 will record the position of the remote sensing unit 600 at the time the above data is sensed and collected, which can then be compared to stored databases to determine if the position is on or adjacent to a street, road or highway.

The stored standards may also include many different combinations of thresholds and/or ranges for the sensed data recorded by various of the sensors within a given period of time which, if met or exceeded, may indicate that an automobile accident has occurred. By way of example, a very sudden deceleration (i.e., a deceleration that occurs more quickly than is possible using high performance automobile brakes) may, by itself, be sufficient to indicate that an automobile accident has occurred. Likewise, a lesser deceleration coupled with glass breaking sounds or a certain level of correlation on the audio recorder to a stored recording of a typical automobile accident may also be sufficient to indicate that an automobile accident has occurred. Very elaborate standards setting forth combinations of sensor data that indicate an incident has occurred may be developed in order to make determinations as to whether or not an incident has occurred with relatively high accuracy.

It will be appreciated that sophisticated stored standards may be necessary to accurately identify certain types of incidents. For example, if a driver runs over a curb or has a flat tire, certain of the sensors may reflect readings that may be similar to the readings associated with certain types of car accidents. As such, the algorithms that are used to determine whether or not an incident has occurred, and/or the algorithms that determine the type of response (if any) that is initiated, may be quite complicated. Increasing the number and/or types of sensors may facilitate increasing the accuracy of these algorithms, but as these numbers increase the complexity of the algorithms may likewise increase.

In certain embodiments of the present invention, the algorithms (stored standards) that are used to determine whether or not an incident has occurred can include a component that provides a degree of certainty that an incident has occurred (e.g., 1 sigma from mean) and/or a probability that an incident has occurred (e.g., an 80% probability). Thus, while the system component that analyzes the sensed data may make a "determination" that an incident has occurred if a certain threshold is passed, by providing degree of certainty and/or probability data it is possible for the system to provide an indication as to the risk that an incorrect determination may have been made. In some embodiment, such degree of certainty or probability may be forwarded to remote third parties such as police, fire departments etc. so that they may take this information into consideration in determining whether and how to respond to the incident. An additional advantage to using such algorithms is that the numerical estimation allows for historical tracking of how successful the system is at identifying actual incidents. This historical tracking may then be used to tweak the algorithms to improve the accuracy of the system.

While the above automobile accident provides one example of a type of incident that can automatically be identified by the systems and methods according to embodiments of the present invention, it will be appreciated that the present invention is not limited to identifying automobile accidents, but instead may be used to sense and identify a wide variety of additional and/or different incidents. For example, elderly or otherwise less stable individuals could carry remote sensing units 600 that were programmed to sense and identify instances in which they fall down. Other exemplary incidents include fires in homes, offices or automobiles, gunshot detection, plane or boat crashes, fearful screaming, suspicious behavior, muggings, bombings, war, running out of gas, etc. Thus, it will be understood that this invention may be used to identify and respond to any of a variety of different incidents, and is not limited to certain specific incidents and/or combinations thereof.

The systems and methods according to embodiments of the present invention may also be used to identify an "incident" which is simply that something unusual or unexpected has occurred. In particular, sensor data may be collected that reflects an unusual or unexpected readings on one sensor and/or on a combination of sensors. These "out-of-range" readings may reflect that something unusual is happening and, in these circumstances, it may be useful to ensure that the collected sensed data that exhibits these readings is permanently stored. In many cases, the only response to detection of such readings may be to ensure that sensed data is saved, and perhaps to collaborate with other remote sensing units in the vicinity to see if the aggregated data suggests that some specific type of incident has occurred. In other embodiments, a additional generalized response might also be initiated upon receiving these "out-of-range" readings (even though there is not enough data for the system to deduce the underlying cause of the out-of-range readings) such as, for example, a telephone call to a person associated with the remote sensing unit and/or having a police officer in the vicinity visit the location where the readings were recorded.

FIG. 6 also illustrates one possible implementation of the physical and/or logical connections between the sub-systems of the exemplary remote sensing unit 600. As shown in FIG. 6, the sensor bank 650 senses data and provides the sensed data to the storage unit 620 and/or to the processor 630. The processor may receive information stored in the storage unit 620, the stored standards 640 and/or the stored personal/environmental information block 670, and may also write data to the storage unit 620. The processor 660 receives the output of the clock 660 (which often is simply part of the processor 630. The processor controls communications between the remote sensing unit 600 and external devices such as a system hub, and uses the communication unit 610 to transmit and receive such communications.

Figure 7:
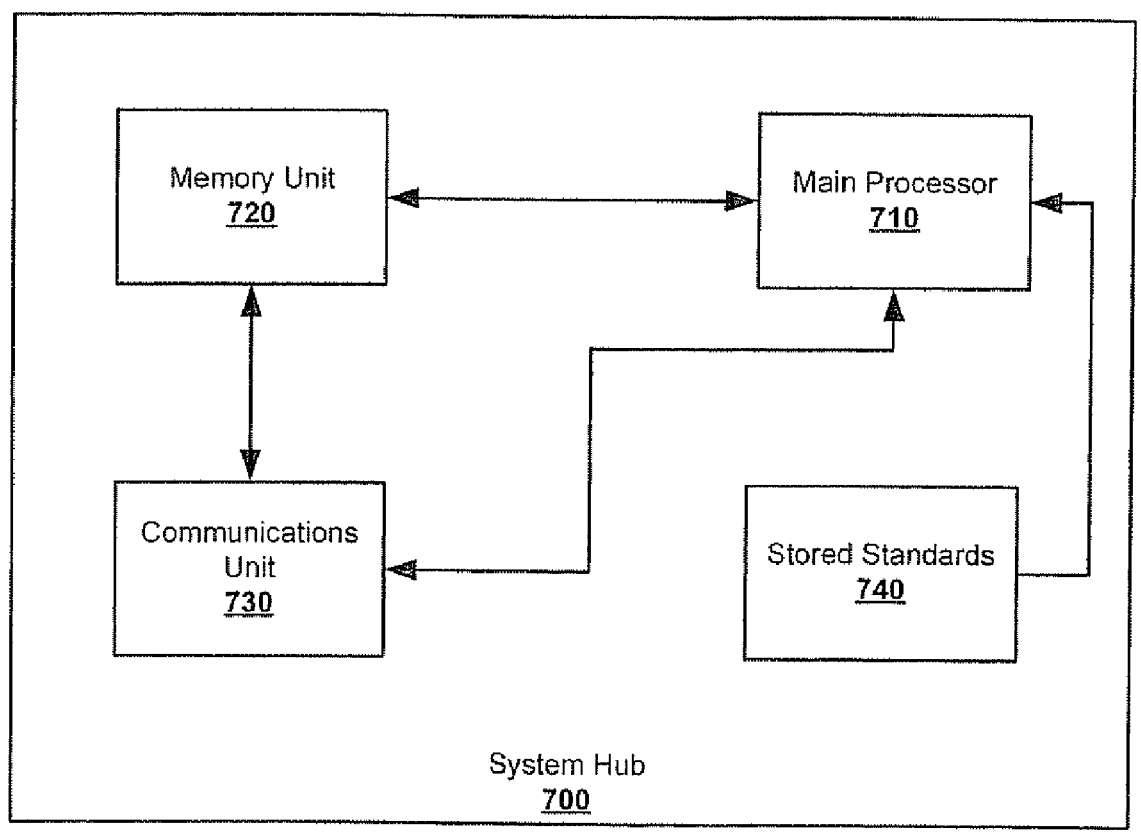
FIG. 7 is a block diagram of an exemplary system hub according to certain embodiments of the present invention.

FIG. 7 is a block diagram that illustrates in more detail a system hub 700 according to certain embodiments of the present invention. One or both of the system hubs 510, 515 in FIG. 5 could be implemented as the system hub 700 of FIG. 5. As shown in FIG. 7, the system hub 700 includes a main processor 710, a memory unit 720, a communications unit 730 and stored standards 740. It will also be appreciated that the system hub 700 may include various other components such as an operating system. The communications unit 730 receives incident alerts and/or incident data from one or more remote sensing units. In response to receiving such alerts and/or incident data from a first remote sensing unit, the system hub 700 may make a determination as to whether there are any additional remote sensing units that were in the vicinity of the first remote sensing unit at the time that a potential incident occurred. If so, the system hub 700 may send a request to these additional remote sensing units for any incident data that they have from the time of the potential incident. These additional remote sensing units forward the incident data for the appropriate time period to the system hub 700, where it may be placed into semi-permanent or permanent storage in memory unit 720.

The system hub 700 may also request that remote sensing units in the vicinity of an incident activate additional sensors or to change the settings on sensors. By way of example, the system hub 700 may determine that a highway camera (i.e., one specific type of remote sensing unit) is in the vicinity of a remote sensing unit that collected data registering an incident. The system hub 700 could send a request directing the highway camera to rotate to view a section of the highway where the incident appears to have occurred. The incident data captured by this highway camera could then be included in an analysis that makes a final determination as to whether or not an incident occurred and/or in an analysis that selects the response that is initiated.

As discussed above, in certain embodiments of the present invention, a first remote sensing unit may make an initial determination as to whether or not an incident has occurred. In such embodiments, the system hub 700 may thereafter make a second determination based on not only the incident data received from the first remote sensing unit, but also based upon incident data received from additional remote sensing units that was provided in response to a request from the system hub 700. By collecting incident data from a plurality of remote sensing units that were in the vicinity of the incident at the appropriate time, it may be possible to increase the accuracy of the system in correctly identifying the specific type of incident that has occurred.

Figure 8:
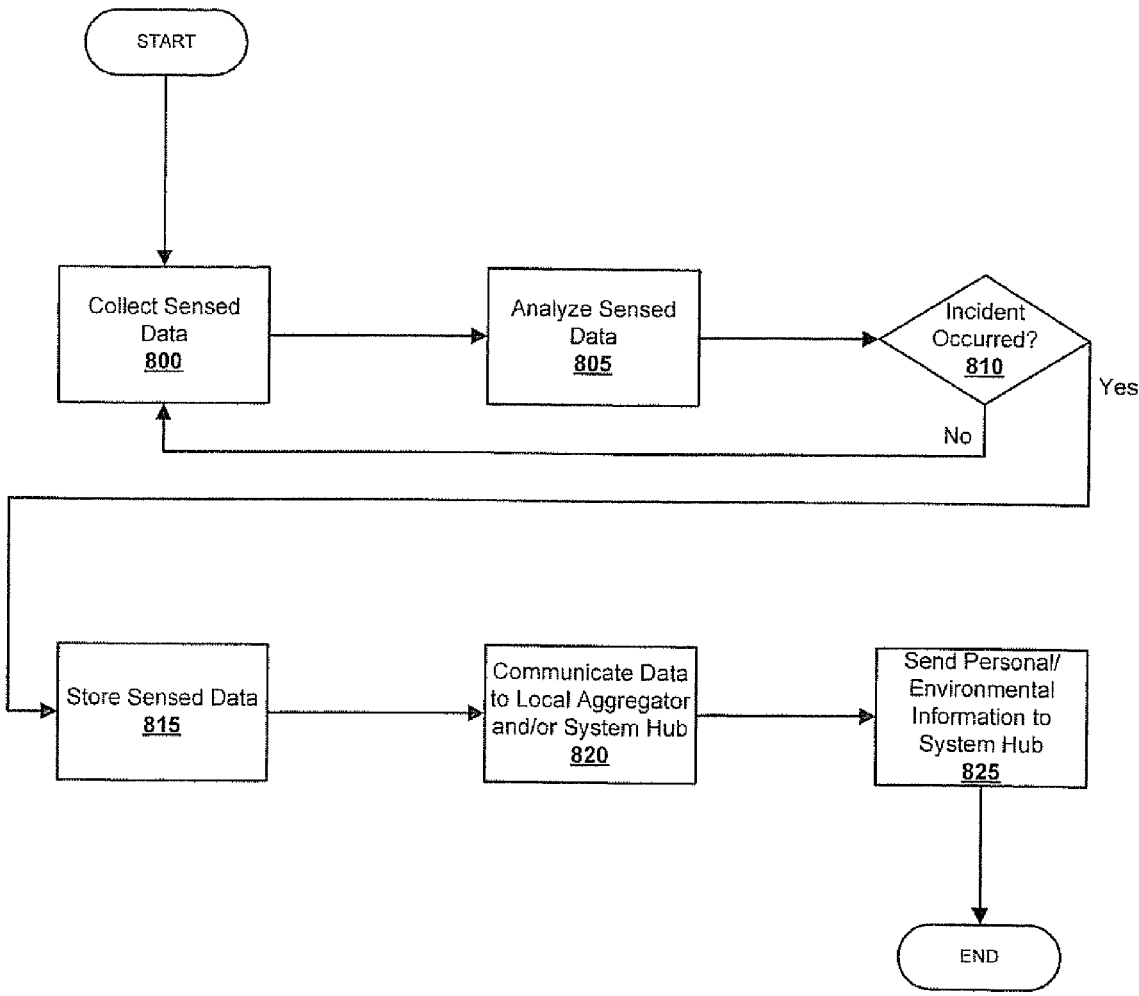
FIG. 8 is a flowchart illustrating operations for collecting and analyzing data at a remote sensing unit according to certain embodiments of the present invention.

FIG. 8 is a flow chart that illustrates methods according to certain embodiments of the present invention for a remote sensing unit such as remote sensing unit 600 to identify and respond to an incident. As shown in FIG. 8, operations may begin at block 800 with the collection of sensed data by one or more of the sensors of a first remote sensing unit. As shown at block 805 and discussed in detail above, the first remote sensing unit may analyze the sensed data by comparing it to stored standards. Based on this analysis/comparison, a determination may be made as to whether or not an incident has occurred (block 810). If not, operations return to block 800 and the remote sensing unit continues to collect and periodically analyze the sensed data.

If, on the other hand, it is determined at block 810 that an incident has occurred, then operations proceed to block 815 of FIG. 8, where the remote sensing unit may more "tag" or otherwise identify the data collected around the time of the incident for more permanent storage. The remote sensing unit may include instructions that specify the amount and/or range of data that is tagged for more permanent storage in response to identification at block 810 of a potential incident. By way of example, if it is determined at block 810 that an incident occurred at a certain time, data collected from each sensor from a first time (e.g., 10 minutes) prior to the time of the incident up to a second time (e.g., five minutes) after the incident may be lagged for more permanent storage. These amount of data so tagged may vary by sensor, by type of incident, etc.

As shown in block 820 of FIG. 8, at some point information regarding the incident is communicated from the remote sensing unit to a local aggregator and/or to a system hub. The information that is communicated may include, for example, (1) an alert that an incident occurred, (2) incident data which may include raw and/or processed sensed data that relates to the incident, (3) an identification of the time period when the incident occurred and/or (4) an identification of the type of incident. In addition, as shown at block 825, the remote sensing unit may also select and transmit appropriate personal and/or environmental information to the system hub that may be used in coordinating the response to the incident. For example, if the incident is an automobile accident, emergency contact information, medical records and insurance information might be transmitted by the remote sensing unit to the system hub. The system hub then might provide the medical records to an emergency response unit and/or hospital, might place a telephone call to the emergency contact, and/or might notify the identified insurance company of the potential accident. It will be appreciated that the operations illustrated in FIG. 8 need not be carried out serially, and need not be performed in the specific order illustrated.

Figure 9:
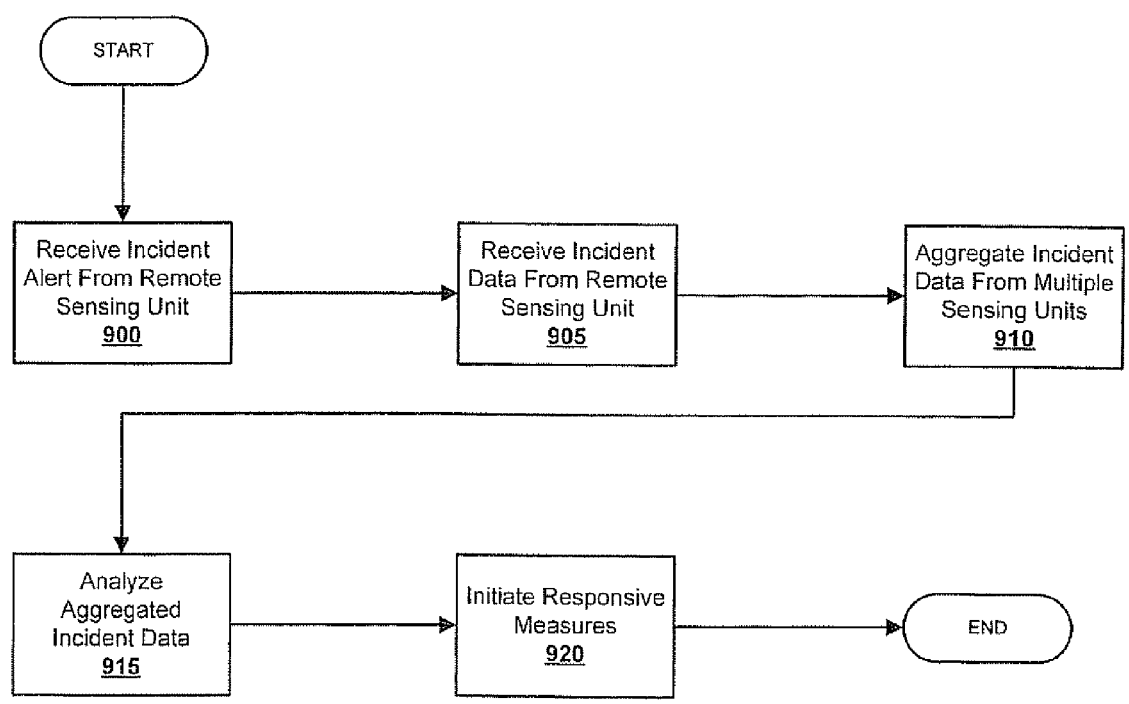
FIG. 9 is a flowchart illustrating operations for responding to an incident according to additional embodiments of the present invention.

FIG. 9 is a flow chart that illustrates methods according to certain embodiments of the present invention for a system hub such as system hub 700 of FIG. 7 to respond to an incident. As shown in FIG. 9, operations may begin at block 900, where the system hub receives an incident alert from a remote sensing unit. At block 905, the system hub receives incident data from the remote sensing unit, which may comprise, among other things, the raw sensed data, processed sensed data and/or other information. It will also be appreciated that the operations of blocks 900 and 905 may be carried out as a single operation, and that the receipt of incident data may comprise receipt of an incident alert. One reason for performing the operations of blocks 900 and 905 of FIG. 9 as two separate steps is it may be advantageous to notify the system hub as soon as it is determined that an incident has occurred, so that information from other remote sensing units may be gathered. Thus, an alert may be sent immediately at block 900 even though the incident in question may still be ongoing (such that the remote sensing unit is still collecting sensed data relating to the incident).

The system hub then at block 910 aggregates the incident data collected at block 905 with incident data from a plurality of additional remote sensing units. To accomplish this, the system hub at block 910 identifies the additional remote sensing units, if any, that are in the vicinity of the incident. In some embodiments of the present invention, the system hub then sends a request to the identified remote sensing units for sensed data that has been collected around the timeframe of the incident. In other embodiments, such information may automatically have been provided to the system hub, rendering such requests for information unnecessary.

Once the data from the additional remote sensing units has been collected, the totality of the data that potentially relates to the incident may be analyzed in an effort to determine the type of incident that has occurred (block 915). Then at block 920, appropriate preprogrammed responses to the incident may be initiated based on the determined type of incident, as is discussed above with respect to other embodiments of the present invention.

Those of skill in the art will appreciate that numerous modifications may be made to the exemplary embodiments discussed with reference to the figures above without departing from the scope of the present invention. By way of example, in some embodiments of the present invention, some or all of the remote sensing units may periodically broadcast information to other remote sensing units, a local aggregator and/or a system hub, regardless as to whether not an incident has occurred. In these embodiments, the remote sensing units may communicate, for example, at least their current location and perhaps other information such as raw or processed data from a subset of their sensors. By continuously broadcasting such information, when an incident is reported by a remote sensing unit, the system may be able to immediately identify the additional remote sensing units that are in the vicinity of the potential incident.

In still other embodiments, the decision making process may primarily occur at the system hub as opposed to at the remote sensing units. In such embodiments, the remote sensing units may regularly or continuously transmit sensed data to the system hub, and the system hub then uses the sensed data collected from one or more remote sensing units to make the initial determination as to whether or not an incident has occurred.

In yet additional embodiments of the present invention, an individual who has access to a remote sensing unit (i.e., the individual carrying a remote sensing unit or driving a car that includes a remote sensing unit) may have the capability to specify that an incident has occurred. For example, after the driver of one automobile hits another automobile, the driver could press a button or activate some other input mechanism on the remote sensing unit that indicates that an incident just occurred. By doing so, the driver may be able to accelerate the system's response to the incident, and also ensure that all relevant sensors are activated, as many incidents (such as a car wreck) can lead to other incidents (such as additional car wrecks). Providing this capability may also help ensure that data relating to the incident is not later overwritten because the system fails to properly determine that an incident has occurred (i.e., the system experiences a false negative).

As discussed above, in embodiments of the present invention, each remote sensing unit may periodically (or continuously) transmit at least basic information to a local aggregator or system hub such as, for example, an identification number, a location, a time, etc. This information may allow the system hub to know a priori how many remote sensing units that are in any particular area. If multiple remote sensing units in a specific area near simultaneously communicate incident alerts, this may tend to strongly indicate that an incident has occurred (and this may be a factor that is considered by the stored standards 640 and 740 in determining whether an incident has occurred). Conversely, receipt of an incident alert from one remote sensing unit and the absence of receipt of incident alerts from one or more co-located remoter sensing units (e.g., when several individuals are riding in an automobile and each individual has a remote sensing unit) may tend to indicate that an incident has not occurred (and this also may be a factor that is considered by the stored standards 640 and 740 in determining whether an incident has occurred).

It will also be appreciated that the systems according to the above described embodiments of the present invention may be operated as a subscription service system. Individuals may purchase or lease remote sensing units, and pay, for example, monthly fees to have access to the system. The subscription service system may permanently store incident data as part of this system, so that subscribers can later access and use that information as needed (e.g., in legal proceedings, to give to medical providers, etc.). The subscription service system may also automatically initiate responses to identified incidents. Subscribers could subscribe to different levels of service, and could customize the type of service provided (e.g., are family members automatically contacted after an automobile accident). In still other embodiments, remote sensing units could offer to sell their sensed data when such data is requested by a system hub or other remote sensing units.

In still further embodiments of the present invention, elements of the system (e.g., a system hub or a remote sensing unit) may send out notifications to other remote sensing units and/or users of the system. By way of example, upon identifying that an automobile accident has occurred at a specific location, a system hub might send out notifications of the incident to other remote sensing units in the general vicinity of the accident (or who are traveling on the road on which the accident occurred). This notification service could, in some embodiments, be operated as a subscription service. This notification service might only be used for a specific subset of the different types of incidents that the system attempts to identify.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of operating a first remote sensing unit, the method comprising:
   collecting data using at least a first sensor on the first remote sensing unit;
   analyzing the collected data;
   determining that an incident occurred based at least in part on the analysis of the collected data;
   identifying a second remote sensing unit that was in the vicinity of a location where the incident occurred; and
   communicating with the second remote sensing unit in response to identifying the second remote sensing unit.

2. The method of claim 1, wherein communicating with the second remote sensing unit in response to identifying the second remote sensing unit comprises requesting that the second remote sensing unit forward data that was collected during a time when the incident was occurring.

3. The method of claim 1, wherein communicating with the second remote sensing unit in response to identifying the second remote sensing unit comprises requesting that the second remote sensing unit save data that was collected during a time when the incident was occurring.

4. The method of claim 1, further comprising tagging for more permanent storage sensor data collected during a time when the incident was occurring.

5. The method of claim 1, wherein determining that an incident occurred based at least in part on the analysis of the collected data comprises comparing the collected data to at least one pre-defined standard to determine whether any of the collected data fall outside expected ranges.

6. The method of claim 1, further comprising activating a second sensor on the first remote sensing unit in response to determining that an incident occurred.

7. The method of claim 1, further comprising modifying a setting on the first sensor in response to determining that an incident occurred.

8. The method of claim 1, further comprising activating an additional sensor on the second remote sensing unit in response to determining that an incident occurred.

9. The method of claim 2, further comprising:
   receiving from the second remote sensing unit data that was collected during a time when the incident was occurring;
   aggregating the data received from the second remote sensing unit with the data collected using the first sensor on the first remote sensing unit;
   analyzing the aggregated data.

10. A method of operating a first remote sensing unit, the method comprising:
    collecting data using at least a first sensor on the first remote sensing unit;
    analyzing the collected data;
    determining that an incident occurred based at least in part on the analysis of the collected data;
    transmitting a page over a paging channel to identify other remote sensing units that were in the vicinity of a location where the incident occurred at a time the incident occurred.

11. The method of claim 10, further comprising receiving location data from at least some of the other remote sensing units in response to the page.

12. The method of claim 10, further comprising permanently storing a subset of the collected data that was collected around the time the incident occurred in response to determining that the incident occurred.

13. The method of claim 10, further comprising automatically notifying at least one remote entity regarding the occurrence of the incident.

14. The method of claim 13, wherein the at least one remote entity that is notified is selected based on a determination that a specific type of incident has occurred.

15. The system of claim 10, wherein the first remote sensing unit includes stored personal information relating to an individual that is associated with the first remote sensing unit.

16. The method of claim 10, wherein analyzing the collected data comprises comparing the collected data to pre-defined standards to determine if the incident occurred.

17. The method of claim 10, further comprising:
    identifying a subset of the collected data that is to be forwarded to a system hub;
    forwarding the identified subset of the collected data to the system hub.

18. The method of claim 10, further comprising activating at least one additional sensor based on the analysis of the collected data.

19. The method of claim 10, further comprising;
    receiving from a second remote sensing unit data that was collected during a time when the incident was occurring;
    aggregating the data received from the second remote sensing unit with the data collected using the first sensor on the first remote sensing unit;
    analyzing the aggregated data.

* * * * *